(12) United States Patent
Levi et al.

(10) Patent No.: US 10,700,880 B2
(45) Date of Patent: Jun. 30, 2020

(54) FLAT DATA ROUTING CHAIN

(71) Applicant: Dinor Adam Vestergaard Levi, Barcelona (ES)

(72) Inventors: Dinor Adam Vestergaard Levi, Barcelona (ES); Arik Halperin, Pardesia (IL); Yariv Trabelsi, Rehovot (IL)

(73) Assignee: Dinor Adam Vestergaard Levi, Barcelona (ES)

( * ) Notice: Subject to any disclaimer, the term of this patent is extended or adjusted under 35 U.S.C. 154(b) by 0 days.

(21) Appl. No.: 15/709,635

(22) Filed: Sep. 20, 2017

(65) Prior Publication Data

US 2018/0115459 A1 Apr. 26, 2018

Related U.S. Application Data

(60) Provisional application No. 62/410,918, filed on Oct. 21, 2016.

(51) Int. Cl.
*H04L 12/24* (2006.01)
*H04L 12/14* (2006.01)
(Continued)

(52) U.S. Cl.
CPC ...... *H04L 12/1403* (2013.01); *H04L 41/0668* (2013.01); *H04L 41/0677* (2013.01);
(Continued)

(58) Field of Classification Search
CPC ..... H04L 47/24; H04L 41/085; H04L 41/302; H04L 41/26; H04L 41/30; H04L 41/16;
(Continued)

(56) References Cited

U.S. PATENT DOCUMENTS 8,611,353 B2 12/2013 Sella et al.
9,729,727 B1 8/2017 Zhang
(Continued)

FOREIGN PATENT DOCUMENTS

CN 105978811 9/2016
WO WO 2015/034754 3/2015
WO WO2017/076652 5/2017

OTHER PUBLICATIONS

European Search Report issued in EP 17197544 dated Jun. 27, 2018.
(Continued)

*Primary Examiner* — Joshua Kading
(74) *Attorney, Agent, or Firm* — DLA Piper LLP US

(57) ABSTRACT

A routing server may receive a request to establish a connection from an originating node to a terminating node. The routing server may determine a route for the connection based on data in the request. Determining the route may comprise selecting at least two of the originating node, at least one virtual node, and the at least one terminating node. The originating node and/or at least one virtual node may establish at least one rule for routing data therethrough. The routing server may establish the connection between the originating node and the at least one terminating node. The routing server may route the data between the originating node and the at least one terminating node according to the at least one rule.

18 Claims, 13 Drawing Sheets

(51) Int. Cl.
   *H04L 12/753* (2013.01)
   *H04L 12/725* (2013.01)
   *H04L 12/761* (2013.01)
   *H04L 12/721* (2013.01)
   *H04L 12/851* (2013.01)
   *H04L 29/08* (2006.01)
   *H04L 12/707* (2013.01)
   *H04L 12/703* (2013.01)

(52) U.S. Cl.
   CPC ............ *H04L 41/085* (2013.01); *H04L 41/12* (2013.01); *H04L 41/5029* (2013.01); *H04L 45/16* (2013.01); *H04L 45/24* (2013.01); *H04L 45/26* (2013.01); *H04L 45/28* (2013.01); *H04L 45/30* (2013.01); *H04L 45/302* (2013.01); *H04L 45/38* (2013.01); *H04L 45/48* (2013.01); *H04L 47/24* (2013.01); *H04L 67/322* (2013.01); *H04L 45/12* (2013.01)

(58) Field of Classification Search
   CPC ......... H04L 41/38; H04L 41/48; H04L 41/28; H04L 41/24; H04L 41/12; H04L 41/0677; H04L 41/0668; H04L 67/322; H04L 12/14; H04L 12/1403; H04L 41/5029
   See application file for complete search history.

(56) References Cited

U.S. PATENT DOCUMENTS

| | | |
|---|---|---|
| 2004/0063424 A1 | 4/2004 | Silberstein |
| 2006/0013372 A1 | 1/2006 | Russell |
| 2008/0126571 A1* | 5/2008 | Leonard ............... G06F 15/173 709/252 |
| 2008/0162698 A1 | 7/2008 | Hopen et al. |
| 2010/0107162 A1 | 4/2010 | Edwards et al. |
| 2013/0232058 A1 | 9/2013 | Milne et al. |
| 2013/0336169 A1 | 12/2013 | Tai |
| 2014/0365680 A1 | 12/2014 | Van Bemmel |
| 2015/0026786 A1 | 1/2015 | Alexander |
| 2015/0063359 A1 | 3/2015 | Sella et al. |
| 2015/0288619 A1 | 10/2015 | Fritsch |
| 2015/0312145 A1 | 10/2015 | Sella et al. |
| 2015/0381487 A1 | 12/2015 | Broz et al. |
| 2016/0241470 A1 | 8/2016 | Sella et al. |
| 2016/0261495 A1 | 9/2016 | Xia et al. |
| 2017/0310595 A1 | 10/2017 | Avidar et al. |

OTHER PUBLICATIONS

U.S. Appl. No. 15/979,859.
International Search Report issued in PCT/JP2017/055705 dated Dec. 21, 2017.
Written Opinion issued in PCT/JP2017/055705 dated Dec. 21, 2017.
Eurasian Search Report issued in EU Application No. 201792098 dated Mar. 23, 2018.
Office Action in Eurasian Application No. 201792098 dated May 8, 2019.
Office Action in EP Application No. 17197544.4 dated Jan. 30, 2020.
Singapore Search Report and Written Opinion issued in SG Application No. 10201708639U dated Apr. 5, 2020.

* cited by examiner

Fig. 1A : Flat Data Routing Chain Platform
(Simple)
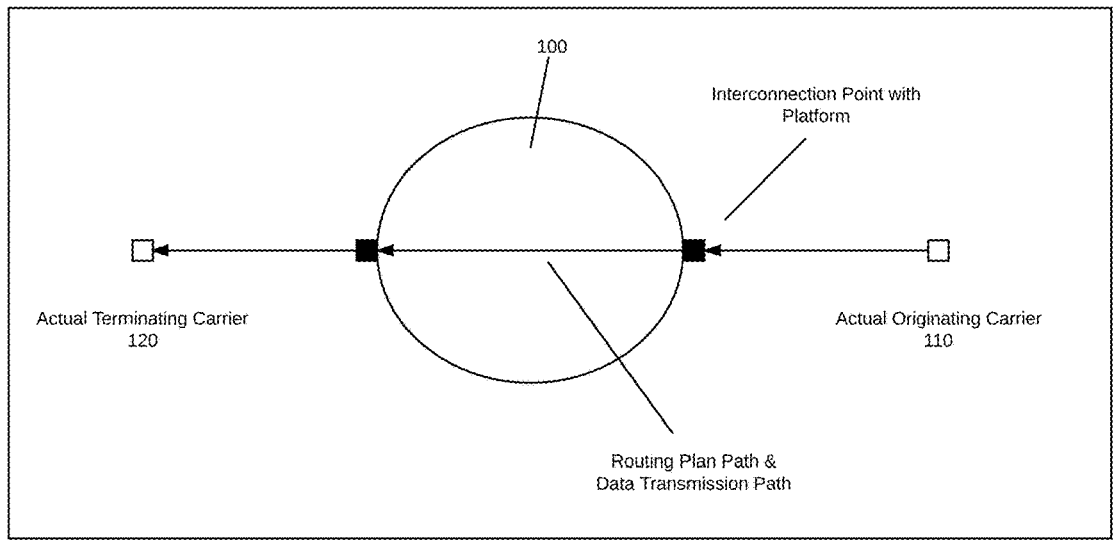
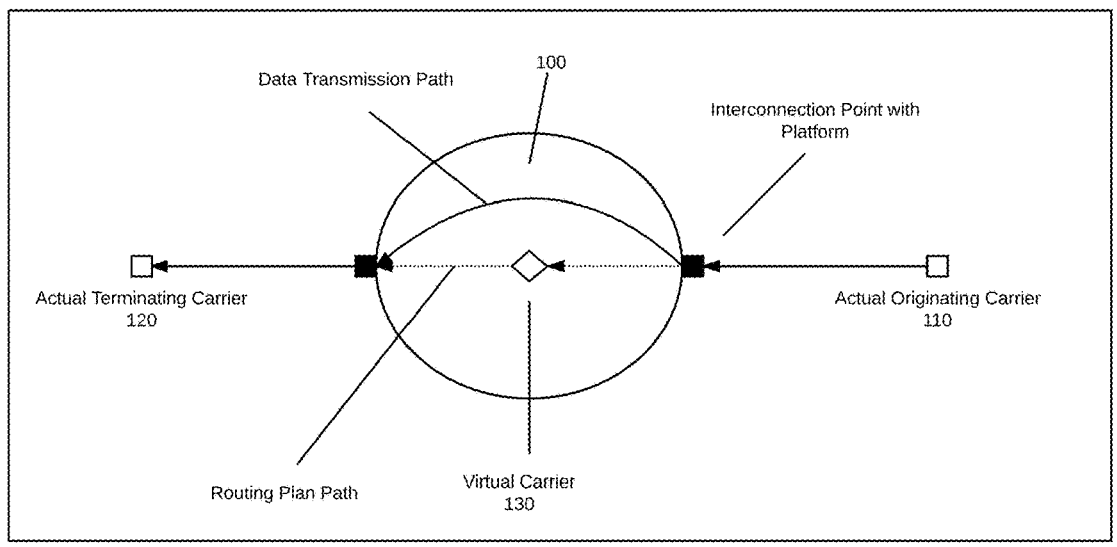
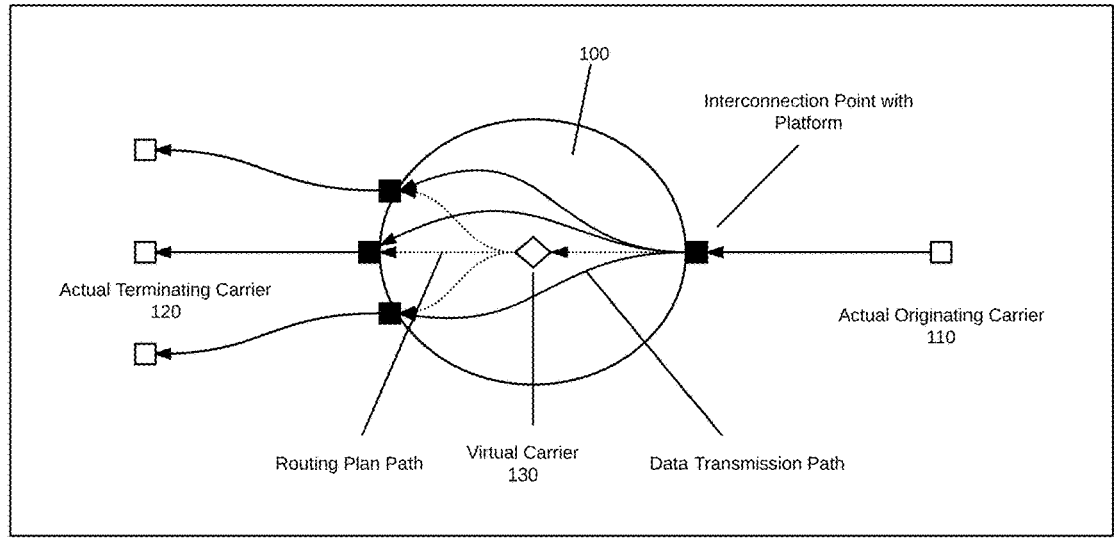

Fig. 1B : Flat Data Routing Chain Platform
(Elaborated )
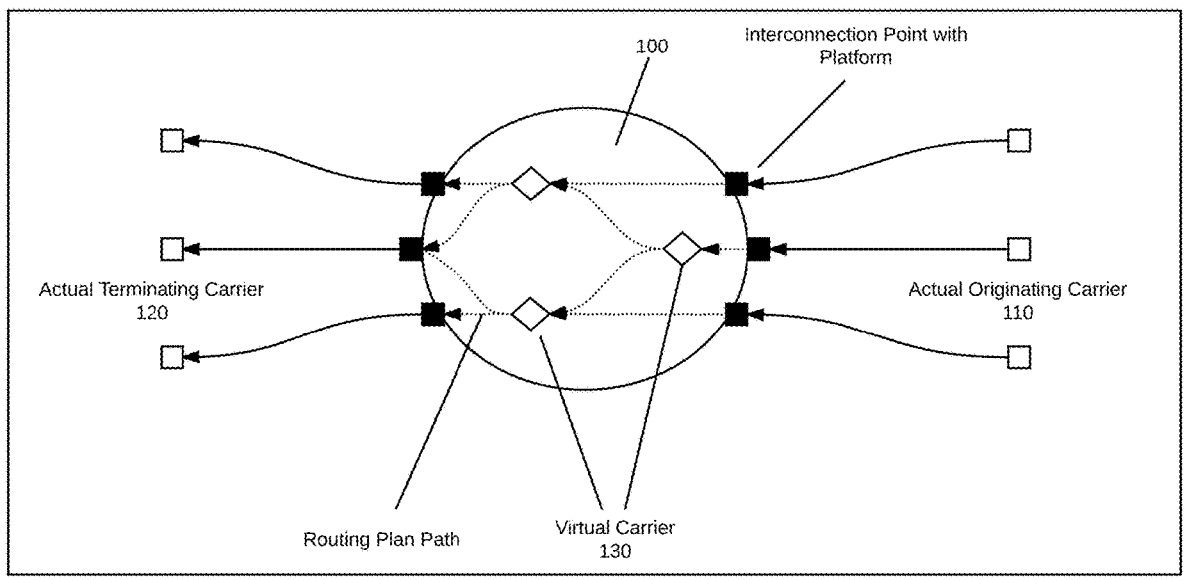
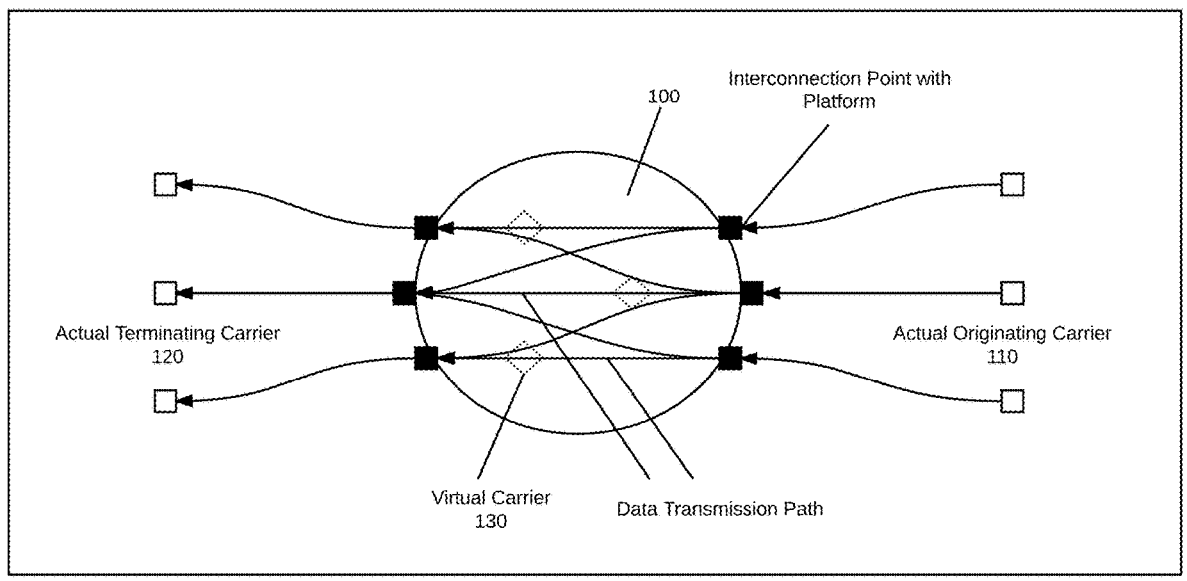

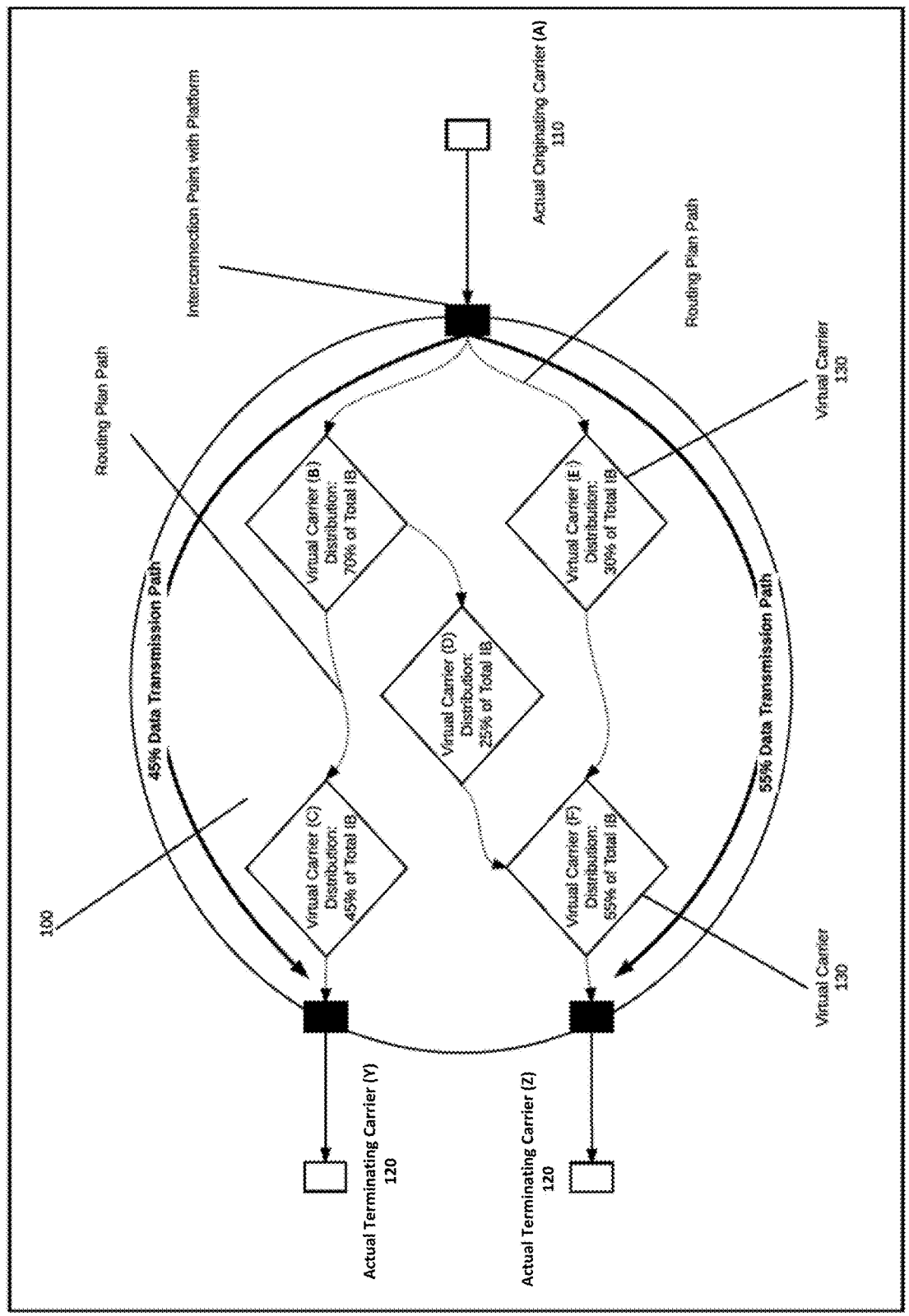
Fig. 2 : Flat Data Routing Chain scenarios

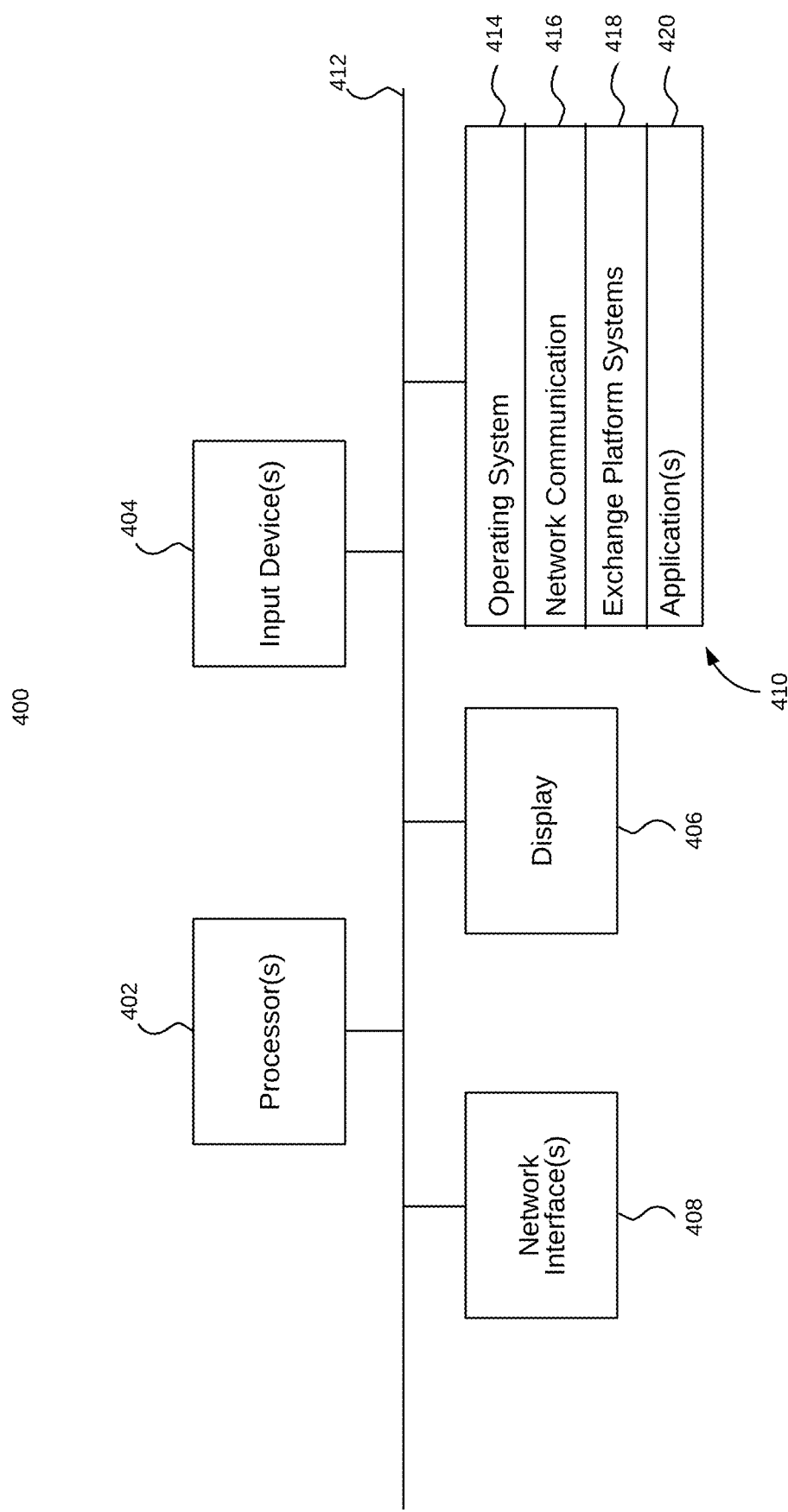
Fig. 3 : Server Architecture

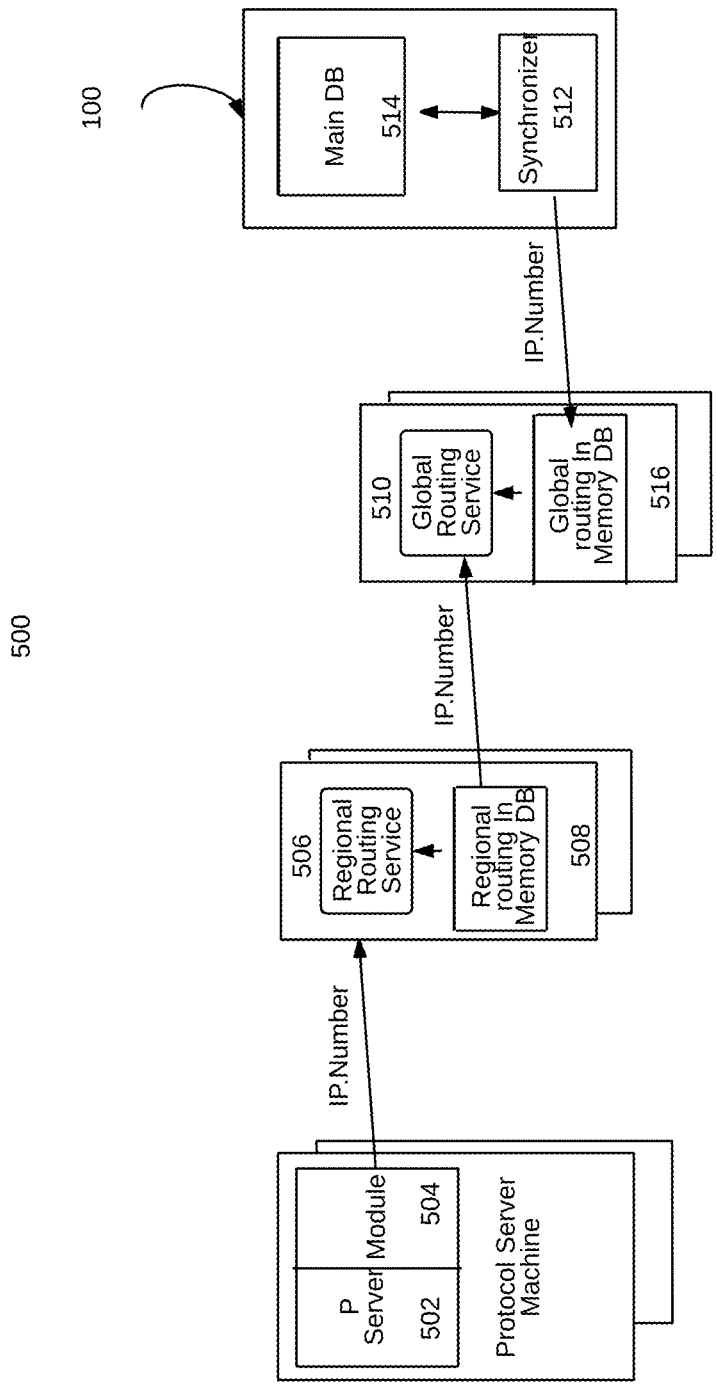
Fig. 4 : Platform Systems Architecture

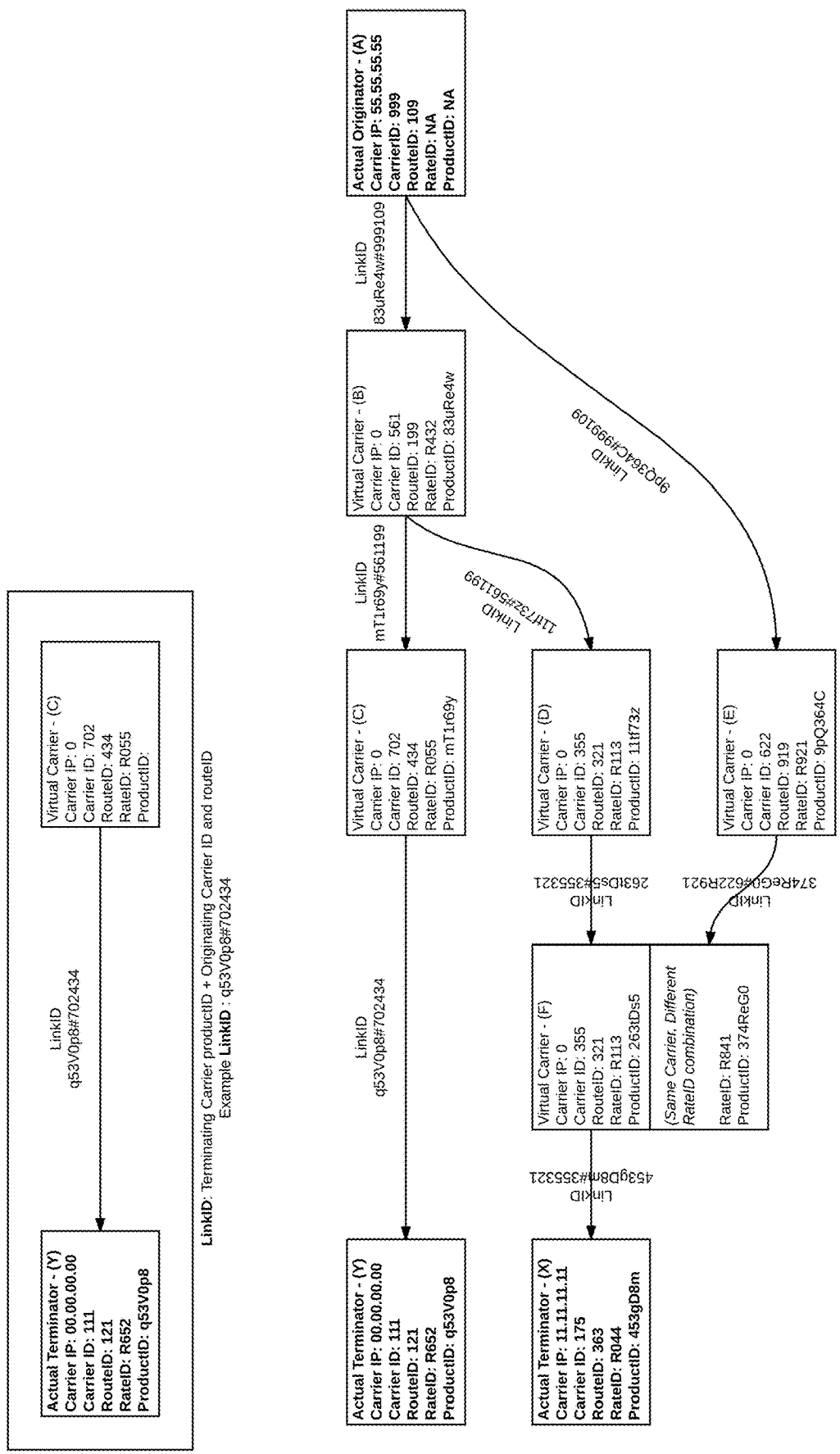
Fig 5 : LinkID Construction

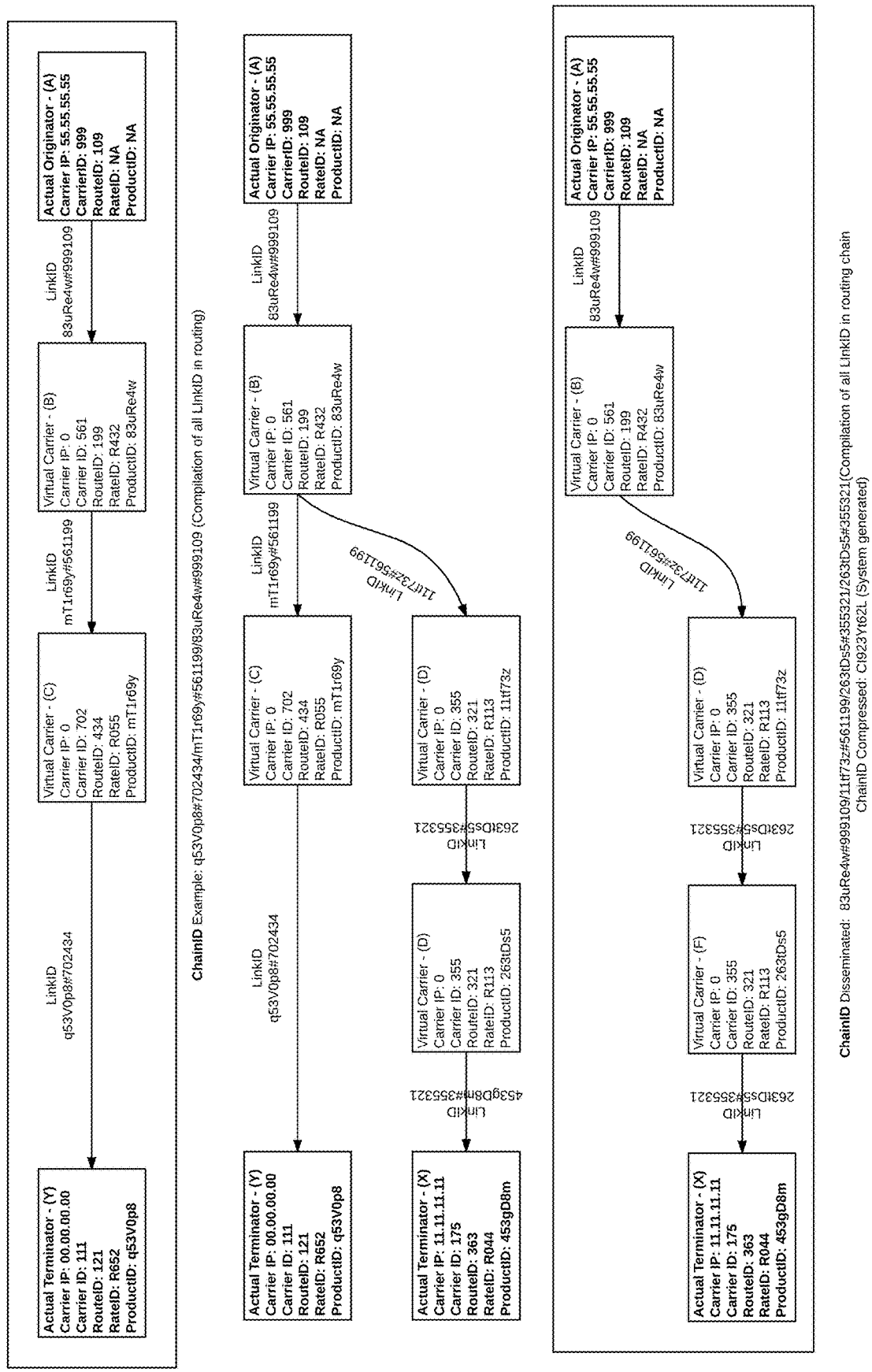
Fig 6 : ChainID Construction

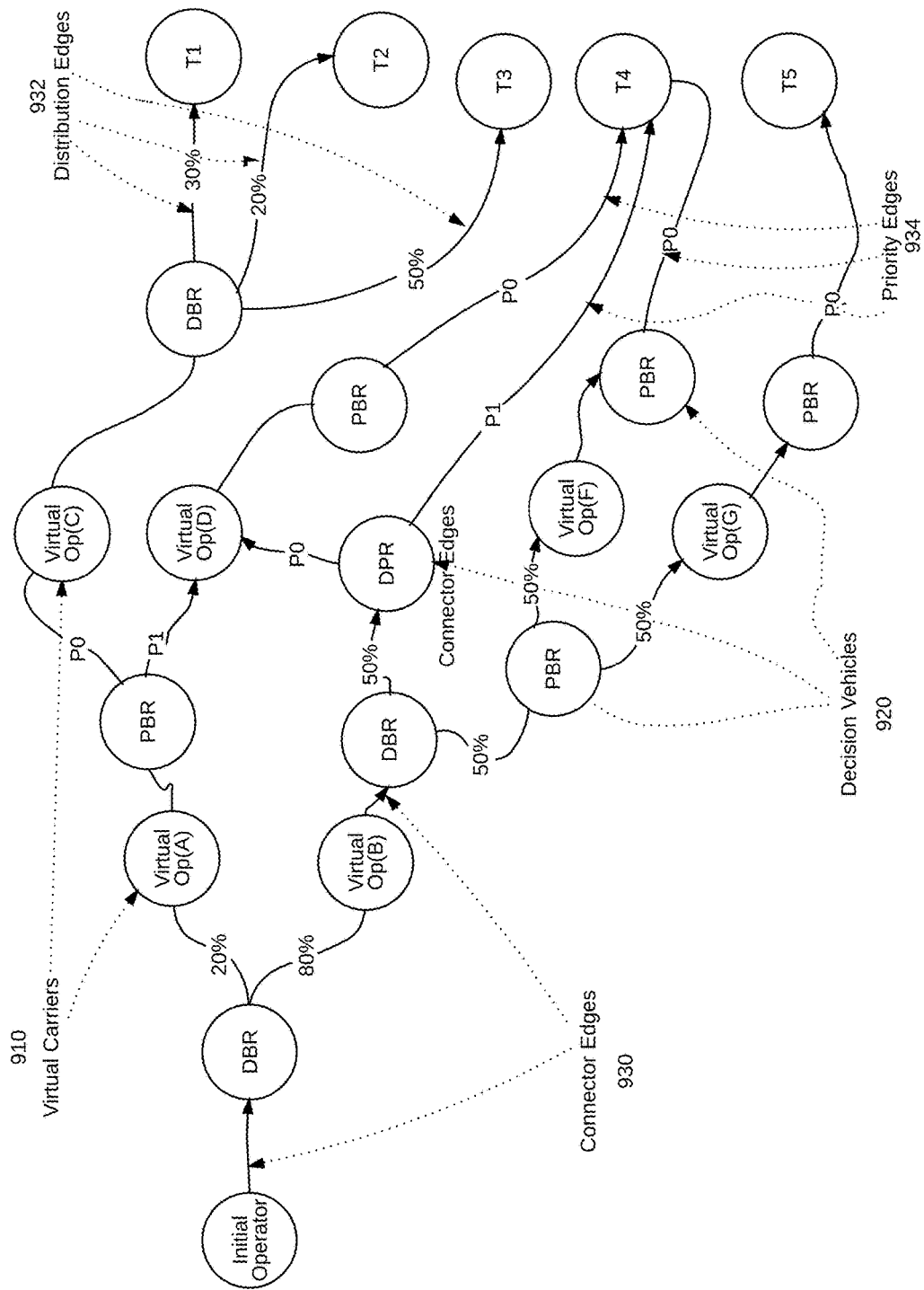
Fig. 7 : Routing Network Graph

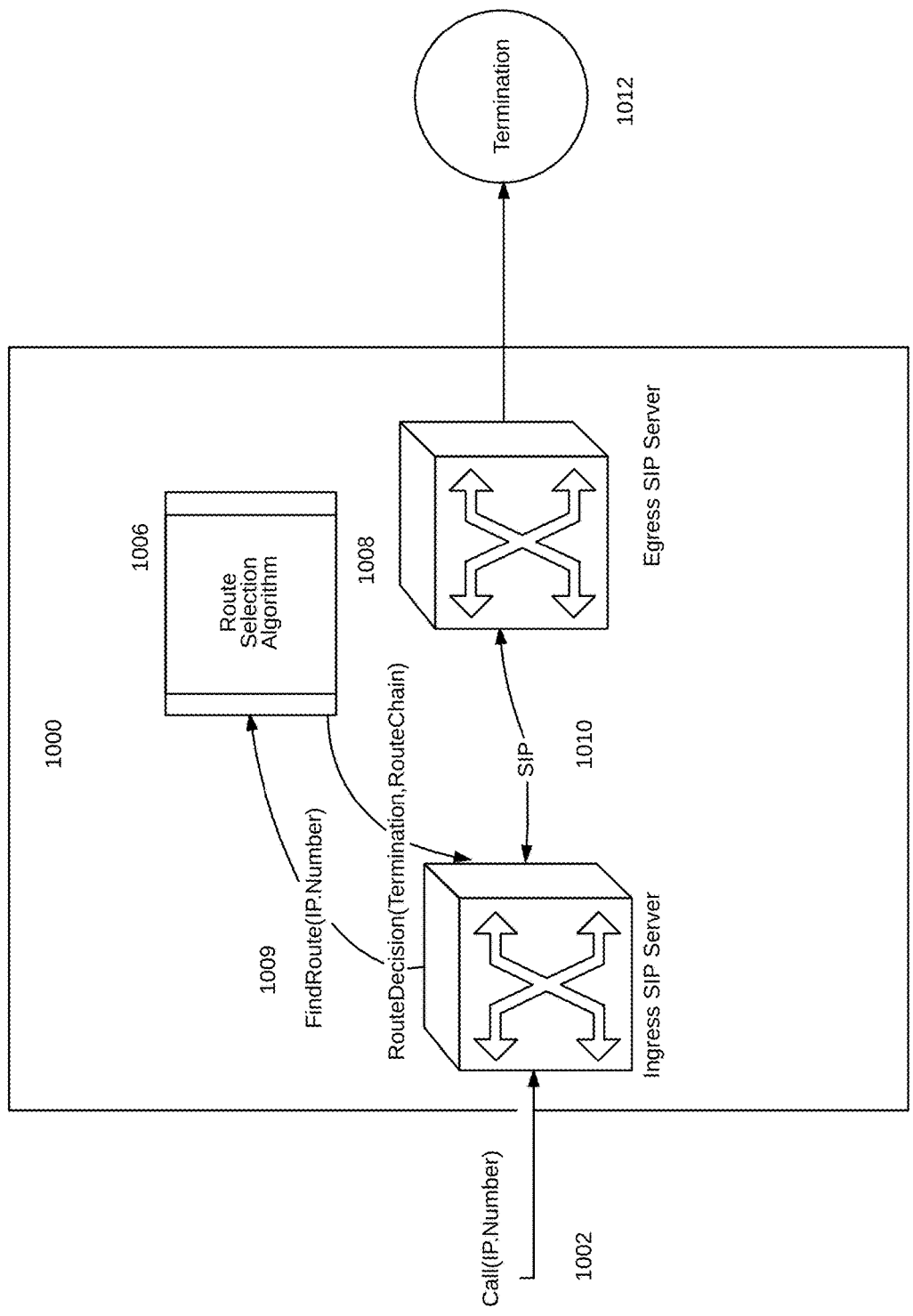
Fig. 8 : Routing Process

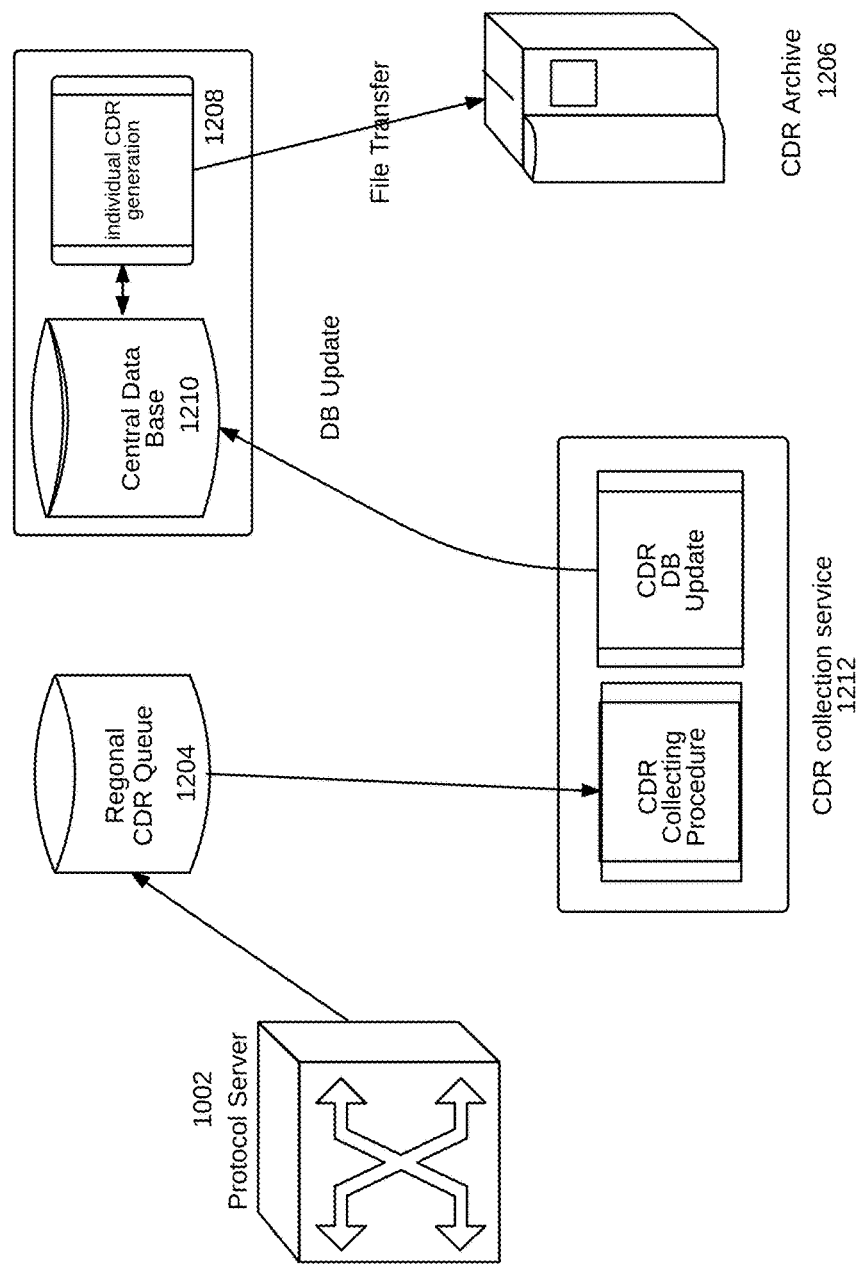
Fig. 9 : post data-routing handling process

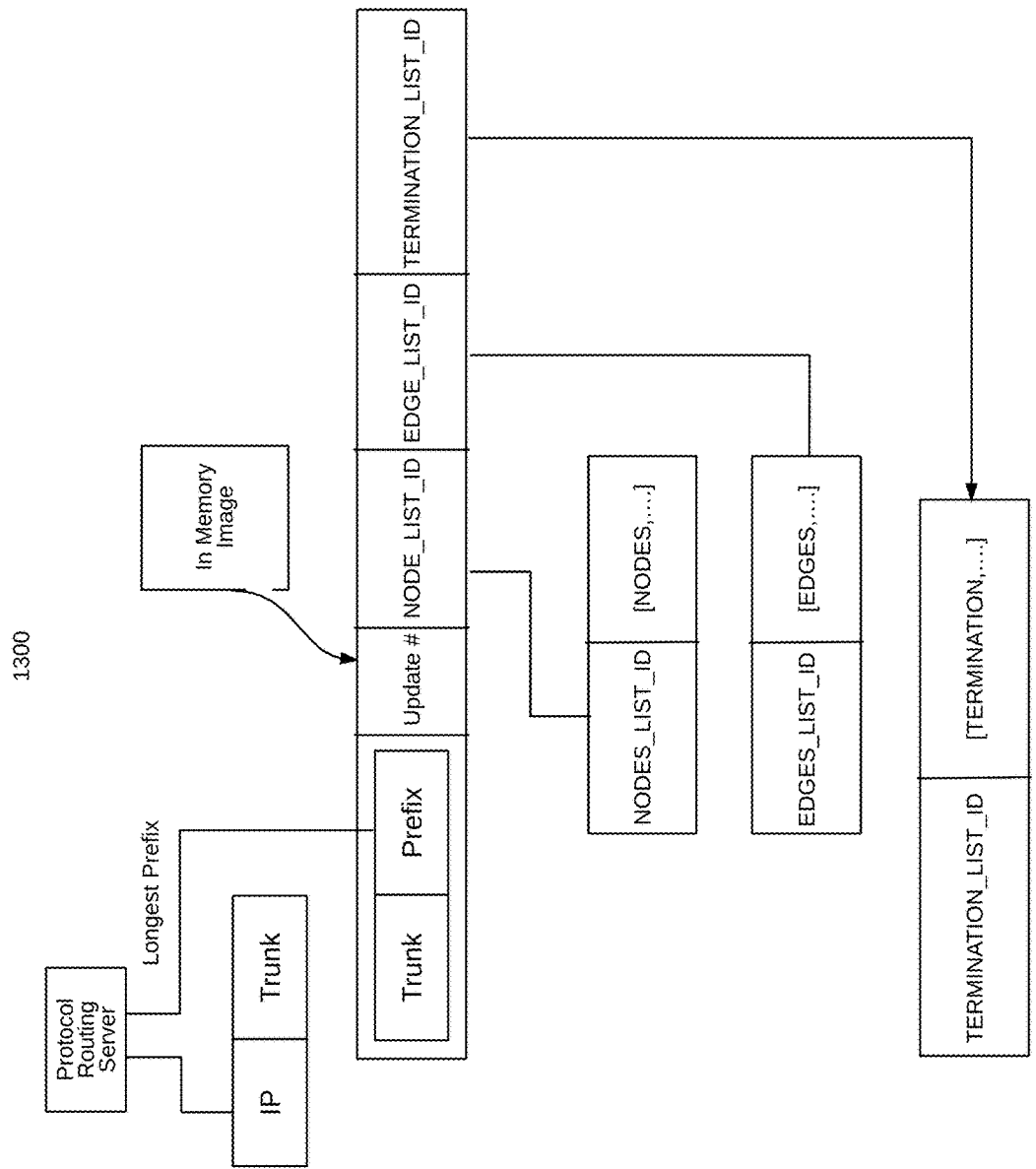
Fig. 10 : data route structure description

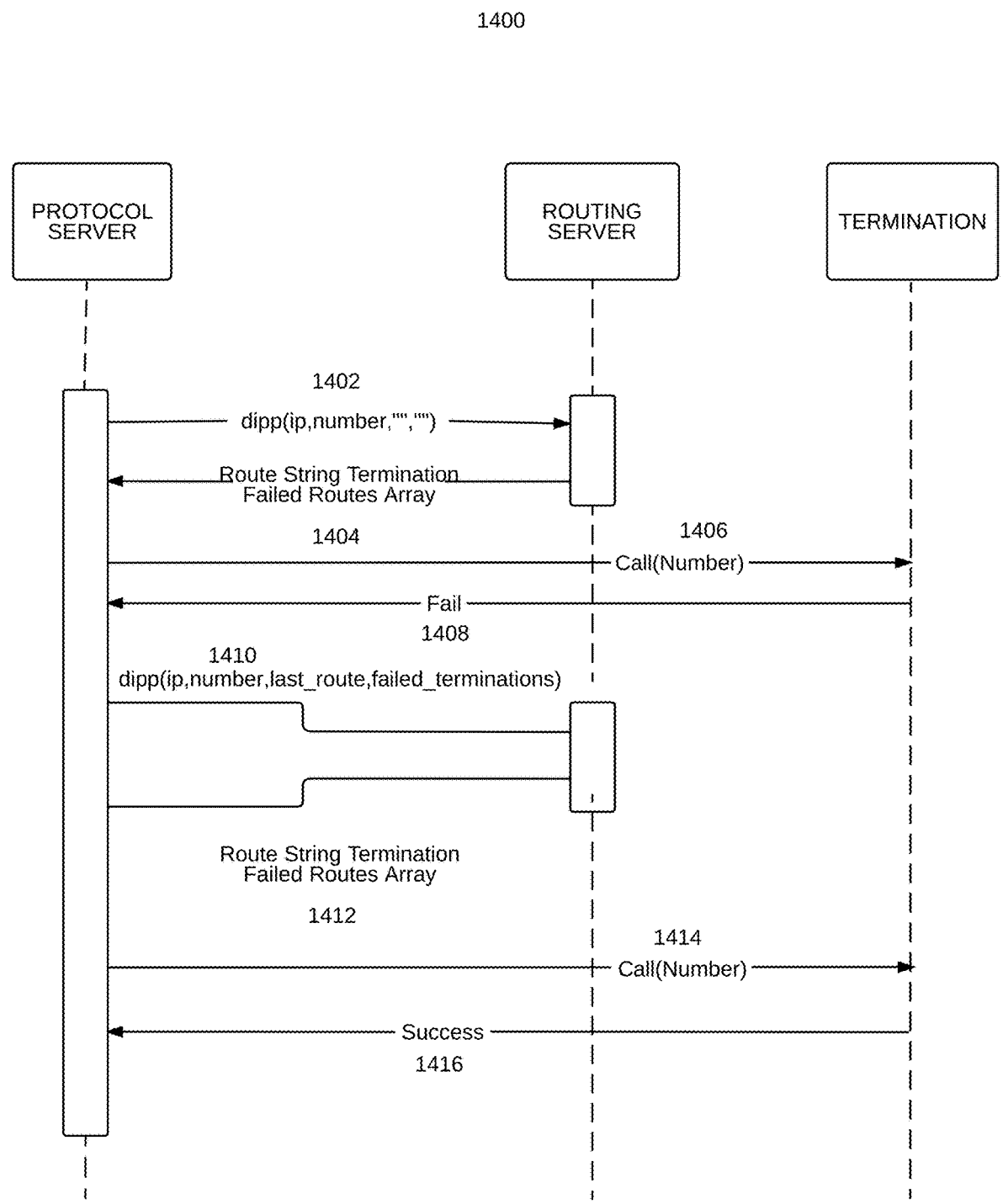
Fig. 11 : Routing Decision Process

Fig. 12 : Physical Routing Process
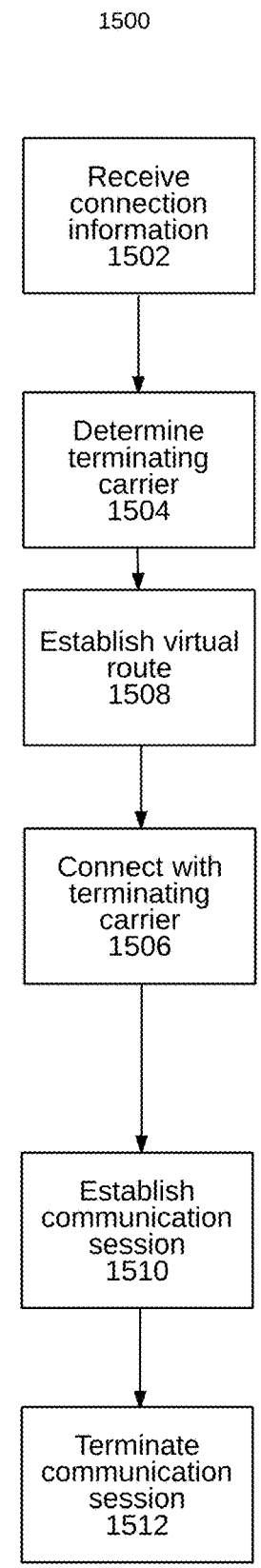

FLAT DATA ROUTING CHAIN

CROSS-REFERENCE TO RELATED APPLICATIONS

This application claims the benefit of priority from U.S. Provisional Patent Application No. 62/410,918, entitled "VIRTUAL DATA COMMUNICATION ROUTING," filed Oct. 21, 2016, the entirety of which is incorporated by reference herein.

BRIEF DESCRIPTION OF THE DRAWINGS

FIGS. 1A-1B show a data routing chain platform 100 according to embodiments of the invention.

FIG. 2 shows example data routing chain scenarios according to an embodiment of the invention.

FIG. 3 is a server architecture according to an embodiment of the invention.

FIG. 4 is a platform system architecture according to an embodiment of the invention.

FIG. 5 is an example of a LinkID construction according to embodiment of the invention.

FIG. 6 is an example of ChainID construction according to embodiment of the invention.

FIG. 7 is a routing network graph according to an embodiment of the invention.

FIG. 8 is a routing process according to an embodiment of the invention.

FIG. 9 is a post data-routing handling process according to embodiment of the invention.

FIG. 10 is a data route structure description according to an embodiment of the invention.

FIG. 11 is a route decision process according to an embodiment of the invention.

FIG. 12 is a physical routing process according to an embodiment of the invention.

DETAILED DESCRIPTION OF SEVERAL EMBODIMENTS

Systems and methods described herein may facilitate unlimited, multi-party data routing chains within a network environment in real time. Systems and methods described herein may enable the consolidation of independent regional and global data routing networks into a singular environment, thus reducing data transfer latency, minimizing data quality deterioration, and streamlining data routing processes and commercial engagement in a secured environment while maintaining independent abilities for each entity to dictate and manage its own routing, technical, administrative, and commercial rules and preferences.

For example, data routing chain platform may create or enable the creation of a connection between one or more physical ("actual") nodes facilitating data transfer between originating nodes (senders) and terminating nodes (receivers).

Additionally, data routing chain platform may create or enable the creation of virtual ("virtual") nodes which may establish connections between one or more actual or other virtual nodes. While data may physically only be transmitted between actual nodes, virtual nodes may dictate the rules and preferences in which the data is to be routed between its connections. Each connection between two independent nodes, actual or virtual, may be described as a link. Links may commence with an actual originating node (physical data sender), end with an actual terminating node (physical data receiver), and may have one or more virtual nodes between them, altogether creating a chain.

Each node, actual or virtual, may use a graphical user interface (GUI) or other system command tools to create connections and establish routing commands and rules between them. The platform may also deliver each node, actual and virtual, with its own transfer detail records (TDR), routing error reporting and handling, commercial transactional records, and other tracking, reporting, and management tools.

Data media may include any data that can be transferred or exchanged between two or more nodes regardless of geographical location, technological medium, data contents or transfer format be it for example fiber optics, radio, wireless or satellite.

The detailed description herein primarily uses the communication media of telecommunications voice calls as an example, but the same features and principles disclosed herein may be used with any data media.

Overview

The following definitions and principles may be useful for the platform overview:

i. Originating IP: Unique identifier of an external network connection sending data to the platform, which may be through Internet Protocol over a network.

ii. Terminating IP: Unique identifier of an external network connection receiving data from the platform, which may be through Internet Protocol over a network.

iii. Origination Port: Designated transmission layer from which data may be sent.

iv. Termination Port: Designated transmission layer to which data may be sent.

v. Carrier: Any actual or virtual node facilitating routing of data media (for example, a voice call). Carriers in the platform may be divided into at least 3 types:

vi. a) Actual Originator: Nodes which may physically send a data transmission to the platform vii. b) Actual Terminator: Nodes which may physically receive a data transmission from the platform viii. c) Virtual: Nodes which may reside between actual originators and terminators, or other virtual nodes, dictating the rules and preferences of data routing.

ix. Both virtual and actual carriers may be an originating carrier (the "from carrier") from which routing is made, or a terminating carrier (the "to carrier") to which routing is made.

x. CarrierID: Unique identifier assigned to each individual carrier, both actual and virtual. A single or group of IPs belonging to same actual carrier may be assigned to its CarrierID. For virtual the IPs designation may be "0".

xi. Routing: The process of defining the rules and preferences set in moving data between one or more nodes.

xii. Routing Prefix (or Technical Prefix): Unique routing identifier that may precede a data destination descriptor (as for example a dialed phone number), dictating the specific routing path of the data.

xiii. Trunk; TrunkID: A unique identifier for the association between a carrier ID, IP address, and routing prefix. A single carrier may have multiple trunks (by having multiple prefixes), each dictating different routing paths.

xiv. Route: May comprise a chain of carriers, from the actual origination node (the physical data sender) to the actual termination node (the physical data receiver), and all virtual nodes in between which may be connected in a specific data routing process.

xv. Destination ID: Routing Prefix+Destination Descriptor (as for example a dialed number).
xvi. Routing Code: Destination code of a specific data transfer used for routing (for example, in a call the routing code may be a country code or area code).
xvii. RouteID (or routing table): Unique identifier of the rules and preferences set for a specific routing path of single or grouped routing codes. A RouteID may be associated to a TrunkID.
xviii. RateID (or Rate Amendment): Unique identifier for each cost record associated with a single or group of routing codes. A RateID may be associated to a RouteID.
xix. LinkID: Unique identifier of a single direct connection between two carriers, actual or virtual, containing the detailed rules and preferences of their connection.
xx. ServiceID: Unique identifier of a specific carrier's service, constructed of CarrierID+TrunkID+RouteID+RateID
xxi. ChainID: Unique identifier representing a compilation of LinkIDs which together create a ChainID, having on one end the actual originator who brings the specific data, as for example a voice call, into the platform through an external network interconnect, and on the other end the actual terminator who takes the specific data, as for example a voice call, out of the platform to an external network, and all the intermediary virtual nodes which may dictate the rules and preferences of the routing path between.

2. Routing decisions: May be a set of rules and preferences defining how data is routed between carriers. There may be at least two types of rules:
   i. Priority Based Rule: Routing belonging to this may be are selected based on priority, for example, priority 0 is the highest then priority 1, and so forth. Routing belonging to this group may have the following properties:
   Originating Carrier
   Terminating Carrier
   Priority: Priority value of the transfer
   Routing Code
   RateID
   RouteID
   LinkID
   ii. Distribution Based Rule: Allow selection of terminating carrier by probability (percentage). The rules may be grouped together and may contain distribution rules where the sum of probabilities of all rules in the group is 100. The groups themselves can be prioritized by priority based rules. A rule from a group may be selected stochastically according to its probability. A routing defined by a distribution rule may have the following properties:
   Originating Carrier
   Terminating Carrier
   Distribution: Percentage of data transfers sent from an originating carrier to single or multiple terminating carriers. The sum of all probabilities for the data routing is 100
   Routing Code
   RateID
   RouteID
   LinkID 3. Originator: Each trunk used to route each data transfer may be connected to an originating carrier. For example, when a call is received by the platform, it may have at least the following 3 properties:
   Originating IP
   Originating Port
   Destination ID
   In order to discover the trunk, the routing process may filter the available trunks to the group of trunks associated with the originating IP. From the group of trunks, a trunk that has the longest match between its technical prefix and the destination number may be selected. When the trunk is discovered, the originating carrier may be identified using the trunk ID.

4. Terminator: A carrier which may be used as routing endpoint. A terminating carrier may have the following properties (In addition to carrier ID):
   Termination IP
   Termination Port
   Routing Prefix to be added to the destination descriptor 5. Error Handling—Errors may be of at least the following two types:
   Logical Errors: Data cannot be routed due to erred routing structure. A logical error can be, for example:
      Trying to traverse a route whose routing code does not support the destination descriptor
      A terminator (actual) that has no IP
   Physical Errors: Data cannot be routed because of an error from the Terminator (Actual)
   Errors may be reported to the platform. The routing decision of the carrier before the error may be retried (both on virtual and actual nodes), and when no next carrier can be selected, the carrier before that may be used, and so on until the actual originator is reached. When the reason for error is an actual terminator, that terminator may be invalidated for the current routing session and may not be retried again for the same data transfer.

FIGS. 1A-1B show a data routing chain platform 100 according to an embodiment of the invention, from the simplest structure to the more elaborated. A network may include actual originating carriers (originators 110), actual terminating carriers (terminators 120), and in between them one or more virtual carriers (virtual 130), which may dictate the routing rules and preferences of data between two or more nodes in accordance. A connection to the platform 100 may provide access to limitless actual and virtual carriers to route data to and from in a real-time environment.

Data may be routed through the platform 100 according to an embodiment of the invention. As only the actual originators 110 and the actual terminators 120 may transfer data through the platform 100, all the virtual carriers 130 who reside inside the platform 100 may only dictate the rules and preferences of how data will be routed between their connections inside the platform 100. As the routing path of the data may be dictated by each virtual carrier inside the platform 100, the data flow may change its direction, priorities, and distributions in accordance with each virtual carrier's dictated rules and preferences. The routing may take multiple twists and turns before a final physical routing path is executed between actual originators 110 and actual terminators 120 in some embodiments.

In the example of FIG. 2, the originator 110 who is sending data to the platform 100 has set up to route 70% of its data to Carrier B and 30% to Carrier E. Carrier B may dictate to route 45% of the originator's data to Carrier C and 25% to Carrier D. Carrier E and Carrier D may dictate to route their combined data, equaling 55% of the Originator's data, to Carrier F. Carrier C and Carrier F may dictate to route their data portions to the Actual Terminators carrier Y 45% and carrier Z 55% which receives the data from platform 100. Thus, the final physical data transfer scheme may be that from Actual Originator A, 45% of the data routes to Carrier Y and 55% to Carrier Z. In this example, carriers B-F are Virtual carriers 130.

Platform 100 may also determine the commercial and financial directives for each actual and virtual carrier involved in the routing chain of the specific data.

System Hardware

FIG. 3 shows a server architecture 400 of the platform 100 according to an embodiment of the invention. One or more servers may host and manage the platform 100. The architecture 400 may be implemented on any electronic device that runs software applications derived from compiled instructions, including without limitation personal computers, servers, smart phones, media players, electronic tablets, game consoles, email devices, etc. In some implementations, the architecture 400 may include one or more processors 402, one or more input devices 404, one or more display devices 406, one or more network interfaces 408, and one or more computer-readable mediums 410. Each of these components may be coupled by bus 412.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, NuBus, USB, Serial ATA or FireWire. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, or Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 6412. Network communications instructions 416 may establish and maintain network connections (e.g., software for implementing communication protocols, such as TCP/IP, HTTP, Ethernet, etc.).

Exchange platform systems 418 may include instructions for creating and managing the platform 100 as described herein.

Application(s) 420 may be an application that uses or implements the processes associated with the platform 100 as described herein. The processes may also be implemented in operating system 414.

The described features may be implemented at least in part in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

FIG. 4 is a system 500 of platform 100 according to an embodiment of the invention. The system 500 may comprise one or more servers (e.g., routing servers) using server architecture 400 and configured to provide the elements of the system 500. The system 500 may include the following features:

i. Main database (DB) 514: System data storage.
ii. Global routing DB 516: A database containing routing network data residing in memory or non-volatile storage.
iii. Synchronizer 512: A process that updates global routing DB 516 with changes made to the routing network.
iv. Global routing service 510: a process or storage converting relational database tables into routing networks and providing an API to query for route network based on origination and routing code.
v. Regional routing database 508: A database for the routing algorithm, containing algorithm subset data and functioning as a cache used by the system in a specific zone.
vi. Regional routing service 506: a process that queries the global routing database 516 or main database 514 if a specific network is not available in regional routing database and provides an API to query for a route network based on origination and routing code. If the main database 514 is used to query for unavailable network, the regional routing service may also perform the function of global routing service 510.
vii. Protocol Server 502: A communication node for the network. The protocol server may get information from the routing algorithm regarding the selected route and data about the termination. The protocol may be Session Initiation Protocol (SIP), for example, or another suitable protocol.
viii. Module 504: The system module inside the protocol server may be a pluggable module implementing system logic as described herein.

Actual and Virtual Routing

The definitions and examples of actual (physical) and virtual routing use the communication media of voice calls in the following section, but the same features and principles disclosed herein may be used with any other data media.

The system 500 may physically transfer data between actual originators and actual terminators as described below. The system 500 may enable virtual carriers to dictate the rules and preferences by which the data is to be routed between the actual originator and the actual terminators as further described in the following section.

Actual and virtual carriers may interact and transact with the platform using similar methods except that actual carriers may maintain an external network connection with the platform 100 to physically send and receive data to/from the platform, while virtual nodes may operate within the platform itself and dictate the way data will be routed within the platform.

The actual data sending and receiving between external network connections and the platform can be described as follows. The protocol server 502 may include one or more servers configured with architecture 400. Accordingly, the protocol server 502 may include one or more network interfaces 408. An originator node may connect to the network interface 408 and provide connection data specifying a terminator node. The protocol server 502 may use the network interface 408 to connect to the terminator node and establish a communication session between the nodes, for example using SIP or another protocol. When the session ends, network interface 408 may receive session termination message. This arrangement may allow a single protocol server 502 to provide the physical connection between nodes in some embodiments, effectively collapsing a traditional series of network nodes into a single server.

FIG. 12 is a physical data routing process 1500 according to an embodiment of the invention. The protocol server 502 may receive a session request 1502 through network interface 408. The request may include Destination ID, which may be used to identify the terminator node and, in some embodiments, virtual data routing information as further described below. The protocol server 502 may identify the terminator node 1504. The protocol server 502 may connect with the terminator node 1506 through network interface 408. The local routing server 506 may calculate the virtual route 1508. The protocol server 502 may establish the physical connection between originator and terminator nodes 1510. When communication between the nodes ends, the protocol server 502 may detect termination through network interface 408 and end the session 1510.

The platform 100 may generate a unique CarrierID and a default routing prefix for each actual and virtual carrier, creating an authentication layer between the platform and the individual carrier. Each carrier may be able to independently expand the default routing prefix by creating extensions thereof (sub routing prefix), enabling a carrier to route to different carriers and/or services simultaneously from, to and within the platform 100.

| Prefix Examples: | |
|---|---|
| Default Prefix: | 527 (000) |
| Sub Prefix: | 527 (001); 527 (002); 527 (003); etc. |

Routing Example 1

Carrier has 3 different data service qualities (RouteIDs)—Silver, Gold, and Platinum. In order to differentiate and receive data from the platform 100 to the designated service level on the Carrier's own external network, Carrier may create 3 sub prefixes, one for each service quality level.

| (Default Prefix: #995000) | | |
|---|---|---|
| Platinum RouteID: | Sub Prefix: 995701 | Routing Plan: IP + 995701 + Routing Code |
| Gold RouteID: | Sub Prefix: 995702 | Routing Plan: IP + 995702 + Routing Code |
| Silver RouteID: | Sub Prefix: 995703 | Routing Plan: IP + 995703 + Routing Code |

Routing Example 2

Carrier wishes to route simultaneously its data to 2 different carriers for same route code in the platform 100, one for its business to business (B2B) data and one for its retail data. By establishing two sub prefixes, such routing requirements may be achieved.

| Default Prefix #237900 | | |
| --- | --- | --- |
| Retail RouteID: | Sub Prefix 237901 | Routing Plan: IP + 237901 + Routing Code |
| B2B RouteID: | Sub Prefix 237902 | Routing Plan: IP + 237902 + Routing Code |

Routing Example 3

Carrier has multiple managers and wishes to administer each managers' capacity, commercial terms, rates, etc. separately. The carrier may create multiple sub prefixes, one assigned for each manager, from which carrier can control the various parameters it allows for each manager.

| Default Prefix #444000 | | |
| --- | --- | --- |
| Manager "A" RouteID: | Sub Prefix 444001 | Routing Plan: IP + 444001 + Routing Code |
| Manager "B" RouteID: | Sub Prefix 444002 | Routing Plan: IP + 444002 + Routing Code |
| Manager "C" RouteID: | Sub Prefix 444003 | Routing Plan: IP + 444003 + Routing Code |

Each carrier on the platform 100 may receive its own independent routing management interface delivering the functionalities to both actual and virtual carriers alike, enabling independent creation and management Connections (LinkID), Service (Route ID), and Rate (Rate ID), and more.

An example of a platform 100 transaction may be presented as follows:

Process I
1. Actual Terminating Carrier ("ATC") may establish a physical connection with the platform 100 to receive data. (Platform assignment of CarrierID to ATC).
2. ATC creates one or more Sub Routing Prefixes which are assigned to its CarrierID, thus establishing a TrunkID per Sub Routing Prefix to receive data.
3. ATC post to the platform 100 a set of Routing Codes for each Sub Routing Prefix to which it may deliver service. ATC assigns each set of routing codes to a specific TrunkID, thus establishing a RouteID.
4. ATC creates a rate for each routing code or set of routing codes it wishes to present (RateID), and assigns the RateID to a designated RouteID, establishing a ServiceID.
5. ATC may publish its available services (ServiceIDs) in the Platform 100.
6. This "Process I" may be taken by other Actual Terminating Carriers, presenting a multitude of ServiceIDs on the Platform 100 able to receive data from the Platform.

Process II
1. A Virtual Carrier ("VC") may register with the Platform 100 and be assigned a CarrierID.
2. VC may wish to create own Service (ServiceID) by selecting from an array of published ServiceID in the Platform 100.
3. VC may compile the selected Service IDs and create a routing table (RouteID). In the routing table the VC may create routing rules and preferences as distribution or priority between the selected Services, for a specific routing code or a grouping thereof.
4. VC may establish one or more sub routing prefixes and link a RouteID to each Sub Prefix, creating a TrunkID
5. Upon VC placing the ATC services into its routing table, a LinkID is created (LinkID=ATC ServiceID and VC TrunkID).
6. VC may create a rate for each routing code or set of routing codes (rateID) in its routing table (RouteID). By assigns the RateID to a designated RouteID, VC created a ServiceID.
7. VC may publish its available services (ServiceIDs) in the Platform 100.
8. This "Process II" may be taken by other Virtual Carriers, as well as within VCs themselves, presenting a multitude of ServiceIDs on the Platform 100 (published by both Actual and Virtual Carriers).

Process III
1. An Actual Originating Carrier ("AOC") may establish a physical interconnection with the Platform 100 to send data (Platform assignment of CarrierID to AOC).
2. AOC may select and compile various Service IDs (of VC and/or ATC) and create a routing table (RouteID). In the routing table the AOC may create routing rules and preferences as distribution or priority between the selected Services, for a specific routing code or a grouping thereof.
3. AOC may establish one or more sub routing prefixes and link a RouteID to each Sub Prefix, creating a TrunkID.
5. Upon AOC placing the selected Services into its routing table, a LinkID is created (LinkID=ServiceID of termination and TrunkID of origination). Having AOC sending data into the network 100 (creates a LinkID), VC routing the data of the AOC within the network 100 (creates a Link ID) to other VC or ATC (created a LinkID), and ATC receive the data from the network (creates a LinkID)—all together they present a complete ChainID of service delivery end to end.

When data (for example a call) enters the platform 100, it may be looked up in the platform's routing system to identify its routing path, starting with the actual originator, passing through the connected virtual carriers and ending with the actual terminator, considering each carrier's dictated routing rules and preferences for the specific data.

Once the routing path has been identified, and thereby the actual transmission path (Actual Originator to Actual Terminator), a Transfer Detail Record (TDR) may be generated, a ChainID (representing the compilation of all LinkIDs in the Chain) may be inserted into the (DDR), and data may be transmitted through the platform 100 commences.

The TDR may be continuously updated in real time, recording any failures, reattempts, timestamps etc. until the moment of a definitive transmission success when the TDR is sealed and handed for processing. At this point the ChainID may be retrieved from the TDR and may be disseminated to LinkIDs, CarrierID, RegionID, RateID, etc., making all parameters for the single specific data routing and transmission available for each carrier.

FIG. 5, based on the routing graph shown in FIG. 2, shows an example of LinkID creations between actual and virtual carriers; while FIG. 6 shows an example of how the individual LinkIDs within a single routing string, from an actual originating carrier to an actual terminating carrier, create a ChainID.

A TDR created by the protocol server may contain basic information about each data routing, for example:
Data origination information
Data destination information
Routing and transmission path Virtual and Physical routing errors Transmission times and duration Charge per data at each routing node And more The system 500 may use one or more algorithms to perform the route selection and data generation processes described above. The following definitions may be useful for understanding the algorithms:

- Vertices and Edges: A vertex (plural vertices) is the fundamental unit of which graphs are formed: an undirected graph includes a set of vertices and a set of edges (unordered pairs of vertices), while a directed graph includes a set of vertices and a set of arcs (ordered pairs of vertices). In a diagram of a graph, a vertex is represented by a circle with a label, and an edge is represented by a line or arrow extending from one vertex to another.
- Directed Graph: Set of vertices connected by edges, where the edges have a direction associated with them. In formal terms, a directed graph is an ordered pair G=(V, A).
- Virtual Provider Vertex: A vertex that represents a carrier.
- Decision Vertex: A vertex which hosts decision logic for selection of the next vertex in route. Two examples of routing policies are as follows:
- Priority Based Routing: Routing performed on a strict priority basis. Lower priority routes will be used if the higher priority routes fail.
- Distribution Based Routing: Routing performed by distribution (e.g., Percentage)
- PBR Vertex: A vertex that represents a junction for Priority Based Routing (PBR).
- DBR Vertex: A vertex that represents a junction for Distribution Based Routing (DBR).
- Dipping: The action of selecting a route and placing a call using the route.
- Dipp Error: A situation where the communication failed due to error in termination.
- Dipp Success: Call was placed on a route and was successfully performed.

A multiple routing network may route communications between originating carriers to terminating carriers in a switching network. For example, the network can be described as a directed graph utilizing the following principles:

Vertices may be 5 types:
- Originator Vertices
- Termination Vertices
- Virtual Carrier Vertices
- DBR Vertices
- PBR Vertices
- A virtual carrier vertex or an originator vertex is followed by a decision vertex for the purpose of deciding the next vertex in route.

Edges may be 3 types
- Connector Edges: Connect vertices to routing vertices (DBR or PBR)
- PBR Edges: Edges with priorities, exiting PBR vertices. These edges may be numbered from 0 to n−1 where n is the number of edges exiting a PBR vertex. 0 priority is the highest, n−1 is the lowest.
- DBR Edges: Edges with percentages, exiting DBR vertices. The sum of all percentages may be 100%

FIG. 7 is a routing network graph 900 providing an example to illustrate the algorithms used by system 500. The graph 900 includes virtual carriers 910 and decision vertices 920 as nodes. These nodes may be connected to one another through connector edges 930. Some connector edges may be distribution edges 932, wherein the connection is routed based on a distribution percentage. Other connector edges may be priority edges 934, wherein the connection is routed based on a priority. In the graph 900, the vertices with no parents are originating operators, which represent a specific Routing code. The vertices without exiting edges in the graph 900 represent termination points, or the final terminating endpoint exiting the platform. The virtual operator vertices are connected to routing decision vertices.

FIG. 8 is a routing process 1000 according to an embodiment of the invention. The routing server may include a routing server database holding the network routing maps for all carriers, trunks, and routing codes associated with those carriers. The routing server database may be part of the central database for the system. When a call comes into the system, it may enter at the ingress protocol server 1002. The ingress protocol server may give the originating IP and number to the routing server to apply the route selection algorithm 1004. The route selection algorithm may determine a routing decision including a termination (egress protocol server) and a route chain (virtual providers chain) 1006 and return the decision to the ingress protocol server 1008. The termination data may be used by the ingress protocol server to route the call to the egress protocol server 1010, which may route the call to termination 1012. The process is called a DIPP.

FIG. 11 is a route decision process 1400 according to an embodiment of the invention, providing another example of how routing may be accomplished. This example uses IP call communication media, but similar processes may be used for other communication media. The process 1400 may proceed as follows:

Protocol server may send dipp (ip, number, previous_route, failed_terminations) 1402 to routing server Parameters:
 ip: Initiating IP
 number: Technical Prefix+code
previous_route: Previous route tried in order to continue from same route decisions except for failed termination.
failed_terminations: List of failed terminations from previous attempt for current call Routing Server May Return Value 1404 to Protocol Server:
 Route String: A string of data representing the route
 Termination: Properties of the chosen termination
 Failed Routes Array: A list of routes that failed due to bad configuration The dipp API may be used to calculate a route for a call coming in to a number preceded from IP. The API may be called by the Protocol Server for each call until it succeeds or fails a number of times>Max fails for call. For example, protocol server may attempt the call 1406 and fail 1408. If so, protocol server may send another DIPP including the failed call information 1410 and receive another route 1412. In the example of FIG. 14, this route may be tried 1414 and may succeed 1416. The following definitions may apply to dipping (trying a route) and/or re-dipping (retrying a route):

previous_route format: The previous route is a list of carrier IDs separated by a '|': "1111|2222|3333| . . . |Termination carrier ID". It may be sent to the route server in order for it to be able to do a reedpipe using the previously attempted route.

Failed_terminations: Aggregation of previously failed termination IDs for the call.

Route_string format: The route string may be built of groups of 5 elements separated by a '|'.

The elements appearing in the route string may be:
LinkID
Originator Trunk ID
Terminator trunk ID
Route ID
Rate ID Failed_routes format: A string containing route IDs that failed due to misconfiguration. They may be separated by '|'. They may be reported to the main data base as route failures.

Termination Data:
  Egress IP & Port: Address of termination
  Egress Protocol IP & Port: Address of Egress Protocol server
  Prefix: Technical Prefix to add to the destination ID In the first attempt for a call, the last route may be empty and so may be the terminations. In the second attempt, the routing decision may be made based on the last route (retracing in the tree from the last failed termination) and on the failed termination of the first attempt (which may be invalidated for the second attempt). In the third attempt, the route from the second attempt may be used, and the termination from the first and the second attempts may be invalidated. This may repeat until the call either succeeds or exceeds the maximum allowed retries.

An example routing algorithm used to determine a routing decision (e.g., apply the route selection algorithm 1004) may solve a routing problem. The routing problem may be defined as follows. Given a large enough set of calls C and a graph G, route the calls through the graph so that all the probabilities and priorities are honored. The algorithm described below assumes a single network with multiple entry points combining all Routing codes. It is important to note that the information in a routing network can be divided into sub trees, each defined by a Routing code and an originating carrier trunk ID. Furthermore, the algorithm described below assumes traversal by carriers, it can also work by traversing by trunks.

The routing problem may be expressed as follows:
Given a Directed Graph $G=(O, T, V_c, Vd, Vp, Ed, Ep, D)$
Where:
  $V_c$ is the set of vertices designating Virtual Carriers
  O is the entry point to the graph(root)
  $T \epsilon V_c$ The set of terminations in the graph
  Vp is the set of vertices which use priority based routing
  Vd is the set of vertices which use distribution based routing
  Ed is the set of edges in the graph which are used for distribution based routing
  Ep is the set edges in the graph which are used for priority based routing
  D is the maximum length of a path in the graph Trunk table: A list of trunk IDs, each of which may have an associated pair of IP and technical prefix.

A probability of an edge $e_{ij} \epsilon Ep$, directed from $v_i \epsilon Vd$ to $v_j \epsilon [V_c|Vd|Vp]$ is defined as Pij, which may be a number between 0 and 100, defining the percentage of calls arriving at Vi which will be routed on the edge e.

A priority of an edge $e_i \epsilon Ep$, directed from $vi \epsilon Vp$ to $vj \epsilon [V_c|Vd|Vp]$ is defined as Iij, which is a number between 0 and n−1, where n is the number of edges exiting vi, defining the selection priority of the edge for calls exiting vi. A value of 0 is the highest priority and a value of n−1 is the lowest priority.

A route is a path between O to a node $t \epsilon T$. The path is built from O through vertices belonging to $V_c$.

i. Termination Carrier Properties:
A vertex designating a termination of a route may carry the following properties:
  Carrier ID
  Termination IP: IP of the termination to be used
  Termination Port: Port of the termination to be used
  Egress Protocol Server IP: IP of the Egress Protocol Sever to be used when exiting the network
  Egress Protocol Server port: Port of the Egress Protocol server to be used when exiting the routing network
  Technical Prefix: (to prefix): Technical prefix of numbers exiting the routing network ii. Originator Carriers Properties:
  Carrier ID
  Trunk ID
  Technical Prefix(from_prefix): Technical prefix of numbers entering the routing network iii. Edges Properties:
Edges in the graph may carry the following properties:
  Routing Code: The initial prefix of destination ID that traverse this edge
  Rate ID: Rate ID of the edge
  Route ID: Route ID of the edge
  LinkID: Link used to describe the exchange associated with the edge The algorithm may be described using pseudo code and the following macros:

```
get_trunks_and_prefixes(ip)
Parameter:
  -  ip: IP to filter by
Return value:
A list of pairs: <trunk,prefix>
Description:
Returns a filter of the trunk table by ip
trunk_with_longest_prefix(trunks_prefixes, number)
Parameters:
trunk_prefixes: A list of couples <trunk_id, prefix>
number: A number to match with the prefixes
Return value:
Trunk ID
Description:
From a list of trunks and prefixes, return the trunk id IF from the pair whose prefix has the longest
match with the number
originator(trunk_id) :
Parameter:
     Trunk_id: Trunk ID by which to look for an originating node
Return Value:
     Carrier that will be used as originator for the trunk id.
Description:
Return originating carrier vertex for a trunk id.
```

Each trunk ID has an originating node in the graph used as a starting point for routing
Carrier(carrier ID) :
Parameter:
    carrier ID: ID of a carrier
Return Value:
    Carrier Vertex
Description:
Returns a carrier vertex for a carrier id
remove_last_carrier(carrier_string)
Parameter: carrier_string in the form: CID1|CID2|CID3|...|CIDn
Description:
Given a carrier sting in the form: : CID1|CID2|CID3|...|CIDn it removes CIDn from the string.
Invalidate(termination_id)
Parameter:
    Termination_id: The ID of a termination vertex
Description:
    Marks a termination vertex as invalid
Validate(termination_id)
Parameter:
    Termination_id: The ID of a termination vertex
Description:
    Marks a termination vertex as valid
FirstCarrierInRoute(carrier_string)
Parameter: carrier_string in the form: CID1|CID2|CID3|...|CIDn
Return:
Carrier ID
Description:
Given a carrier sting in the form: : CID1|CID2|CID3|...|CIDn it return CID1
LastCarrierInRoute(carrier_string)
Parameter: carrier_string in the form: CID1|CID2|CID3|...|CIDn
Return:
Carrier ID
Description:
Given a carrier sting in the form: : CID1|CID2|CID3|...|CIDn it return CIDn
IsValid(termination_vertex)
Parameter:
Carrier Vertex
Return:
Boolean
Description:
Returns the status of a termination vertex
DecisionVertex(carrier_vertex)
Parameter:
    Carrier Vertex
Return:
Decision Vertex
Description:
Returns the decision vertex of a carrier vertex
NumberOfEdges(DecisionVertex)
Parameter:
    DecisionVertex
Return:
Integer
Description:
Returns the number of edges in a decision vertex
ResetDecisionVertex(DecisionVertex)
Parameter:
DecisionVertex
Description:
Resets the edge marks in a decision vertex. Applicable to PBRs where edges are marked in order not to use them again in case of failure

---

```
Route-Dipp(ip,phone,last_route, failed_terminations)
 1. If(last_route =="") THEN
 2.     Trunk_prefix_list = get_trunks_and_prefixes(ip) //Returns pairs of trunks+technical
                                                        // Prefix for ip
 3.     trunk = Trunk_with_longest_prefix(trunk_prefix_list, number)
 4.     last_route = Originator(trunk) //The originating carrier vertex by trunk
 5. Else
 6.     Remove_last_carrier(last_route) //Last route contains termination
 7. EndIF
 8. For terminationId in failed_terminations
 9.    Invalidate(terminationId) //Mark all terminations whose Id appears
                                 // in failed_terminations string as invalid
10. EndFor
11. originator_id = FirstCarrierInRoute(last_route)
```

```
12. Technical_prefix = Carrier(originator_id).from_prefix //Technical prefix is stored
                                                          //in the from_prefix field of
                                                          // the originator vertex
13. number = remove_prefix(number,technical_prefix) //Remove the tech prefix from beginning
                                                    //of the number
14. While(last_route!="")
15.     carrier_id = last_carrier_in_route(last_route) //Backtrack in case of a previous failure
16.     RemoveLastCarrier(last_route)
17.     (route, failed_logical_routes, termination_data) = Find-Route (0,carrier_id, number)
18.     If(route!=null)
19.         return (route,failed_logical_route,termination_data)//We found a possible route
20.     EndIF
21. EndWhile
22. For terminationId in failed_terminations
23.     Validate(terminationId) //Return terminations to valid state
24. EndFor
Find-route(level, carrier_id, number)
 1. currentCarrier = Carrier(carrier_id)
 2. If currentCarrier Is Termination
 3.     If IsValid(currentCarrier)
 4.         Return ({currentCarrier},{ })
 5.     Else
 6.         Return ({ },{ })
 7.     EndIf
 8. EndIf
 9. If(DecisionVertex(currentCarrier) exists)
10.     result = do-decision(level,DecisionVertex(currentCarrier),number)
11. Else
12.     Return ({ },{ })
13. EndIf
14. Return ({carrier_id|result.carriers},result.failed_logical_transfers)
do-decision(level, decisionVertex, number)
 1. If level>MAX_LEVEL
 2.     Return ({ },{ })
 3. EndIF
 4. Result = ({ },{ })
 5. Attempts = 0
 6. While(Result==({ },{ }) and attempts <NumberOfEdges(decisionVertex))
 7.     Attempts++
 8.     (child,failed_terminations0) = select-child(decision-vertex)
 9.     if(child==null) break;
10.     if(child is a Carrier Vertex)
11.         (route,failed_terminations1) = find-route(child, level, number);
12.     EndIf
13. EndWhile
14. Reset-decision-vetex(decision-vertex)
15. Return (route, {failed_terminations0|failed_terminatons1})
Select-child (decisionVertex, number)
 1. If(decisionVertex is DBR)
 2.     Return select-child-dbr(decisionVertex)
 3. Else
 4.     Return select-child-pbr(decisionVertex)
 5. EndIF
Select-child-dbr (decisionVertex, number)
 1. failed_logical_routes ={ }
 2. value = random(0..100)
 3. count = 0
 4. for(i =0 ; i<numberOfEdges;i++)
 5.     count = count + decisionVertex.edge[i].probability
 6.     If(count>value)
 7.         If(!number.startsWith(decisionVertex.edge[i].code))
 8.             failed_logical_routes = {failed_logical_routes|decisionVertex.edge[i].route_id}
 9.             continue
10.         EndIf
11.         return(decisionVertedx.edge[i].to,failed_logical_routes)
12.     EndIf
13. EndFor
14. Return ({ },failed_logical_routes)
Select-child-pbr (decisionVertex, number)
 1. Failed_logical_routs = { }
 2. Edges = { }
 3. For(i=0;i<NumberOfEdges(decisionVertex);i++
 4.     If(number.startsWith(decisionVertex.edges[i].code))
 5.         Edges = {Edges|decisionVertex.edges[i]}
 6.     Else
 7.         failed_logical_routes = {failed_logical_routes | decisionVertex.edges[i].route_id}
 8.     EndIf
 9. EndFor
10. Edge = HighestUnmarkedPriorityEdge(edges)
```

```
11. Mark(Edge)
12. Return(Edge.to, failed_logical_routes)
```

The number of steps for a call dipping may be as follows:
Time(Call)=NumberOfCycles×MaxDepth NumberOfCycles: Possible number of cycles in the graph MaxDepth=10

The number of cycles in the graph may be proportional to the number of vertices in the graph. If up to N branches and a max Depth D are allowed in each node, then the worst case computation time is proportional to ND.

However, the number of cycles in a real graph may not be large in many cases. Therefore, the time per call may be safely assumed as O(MaxDepth). In short, although the maximum computational time of the algorithm is fairly large, the actual operation time may be brief in practice.

A Protocol Server dipping procedure may be as follows:

```
List<Vertex> Dipp(IP,Number)
    1. trunk = GetTrunkFromTrunkTable(IP)
    2. prefix = LongestMatchingPrefix(NetworksTable)
    3. mapInMemory = NO
    4. If IsInMemory(Prefix)
        i. currentUpdate = UpdateInMemory (prefix)
    5. EndIF
    6. latestUpdate = UpdageInDatabase(prefix)
    7. IF (latestUpdate == currentUpdate)
        i. mapInMemory =YES
    8. EndIF
    9. If (mapInMemory==NO)
        i. FetchMapToMemory(Trunk,prefix)
    10. EndIF
    11. Return FindRoute(RootNode(trunkprefix))
```

FIG. 9 is a post route handling process 1200 according to an embodiment of the invention. TDRs ("Transfer Detail Record") may be recorded in storage on the intermediary TDR server 1204 and transferred as a batch by the TDR collection service 1212 to be stored in the central DB 1210. The central DB 1210 TDR processing may extract the route description of each TDR and create specific TDRs for every carrier in the route 1208. These TDRs may be stored in the central DB 1210 and/or TDR archive 1206 which may reside in a secure location.

A TDR may be generated for each carrier in a route, including information that may be used to rate and bill each carrier in the route (e.g., see FIGS. 8A-8B above). An algorithm for building individual TDRs may be as follows:

```
BuildTDRs(TDRBatch batch)
    1. FOR EACH tdr in batch DO
        a. vrd = tdr.virtual_route_description
    2. END FOR
    3. FOR(i = 0; i<NumberOfProviders(vrd)-1;i++)
        a. vp1 = Provider(vrd,i)
        b. vp2 = Provider(vrd,i+1)
        c. individual_tdr = Duplicate(tdr)
        d. individual_tdr.origin = vp1
        e. individual_tdr.destination = vp2
        f. AddTDRToDatabase(individual_tdr)
    4. END FOR
```

The route description may be in the following form:
|14949|29393|48438|34942
So that:
Provider("|14949|29393|48438|34942",0) Is "14949"
Provider("|14949|29393|48438|34942",1) Is "29393"
And so on.

FIG. 10 is a route description data structure 1300 according to an embodiment of the invention. This example uses IP call communication media, but similar route description data structures may be used for other communication media. For example, the route description may include the following features:
  i. IP-trunk table
  Table containing IP-table mappings used to translate IP into trunk name
  ii. Network table
  A table containing routing network descriptions. Each row may include the following:
    a. Key<Trunk,Prefix>
    b. Routing Code #: The Routing code to be used if the routing network is limited to specific Routing code. The network can be represented with Routing code or without.
    c. Update #: Update number for the routing network
    d. Node list ID: ID of the node list for the routing network
    e. Edge list ID: ID of the edge list for the routing network
    f. Termination list ID: ID of the termination list
  iii. Node Lists Table: A table containing the node lists
  iv. Edges Lists Table: A table containing the lists of edges
  v. Termination Lists Table: A table containing the lists of terminations While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:
1. A routing method comprising:
  receiving, at a routing server, a request to establish a connection from an originating node to at least one terminating node;
  determining, with the routing server, a physical route through at least one network for the connection based on data in the request, the physical route physically coupling the originating node and the at least one terminating node through the at least one network, the originating node establishing at least one first rule for physically routing data through the originating node;

determining, with the routing server, a virtual route for the connection based on data in the request, the determining comprising selecting at least one virtual node, the at least one virtual node establishing at least one second rule for routing data between the originating node and the at least one terminating node, the at least one virtual node being a virtual element stored by the routing server;

establishing, with the routing server, the connection between the originating node and the at least one terminating node along the physical route within the at least one network; and establishing, with the routing server, a detail record for the connection, the detail record including each at least one virtual node in the virtual route and indicating a distribution percentage for each at least one virtual node in the virtual route according to the at least one first rule and/or the at least one second rule.

2. The method of claim 1, wherein the detail record comprises information about:
the originating node;
the at least one terminating node;
a routing path formed by the selected at least two nodes;
at least one routing error;
at least one transmission time;
at least one transmission duration;
an allocation of financial charges to each at least one virtual node among the selected at least two nodes; or
a combination thereof.

3. The method of claim 1, further comprising determining, with the routing server, that the connection between the originating node and the at least one terminating node has failed.

4. The method of claim 3, wherein the determining that the connection between the originating node and the at least one terminating node has failed comprises detecting a failure in at least one of the originating node, the at least one terminating node, and the at least one virtual node.

5. The method of claim 3, wherein the determining that the connection between the originating node and the at least one terminating node has failed comprises labeling the at least one terminating node as a failed termination, the at least one virtual node among the selected at least two nodes as a failed virtual node, or a combination thereof.

6. The method of claim 3, further comprising:
determining, with the routing server, a new virtual route for the connection based on data in the request, the new virtual route comprising at least one new node different from the selected at least one virtual node, the at least one new node establishing at least one new rule for routing data through the at least one new node; and
establishing, with the routing server, a new allocation of credit for processing the data between the originating node and the at least one terminating node according to the at least one new rule.

7. The method of claim 1, further comprising creating, with the routing server, the at least one virtual node.

8. The method of claim 7, wherein the creating comprises defining the at least second one rule for the at least one virtual node.

9. The method of claim 7, wherein the creating comprises defining an allocation of financial charges for the at least one virtual node.

10. A routing system comprising:
a processor coupled to an originating node and at least one terminating node, the processor configured to:
receive a request to establish a connection from an originating node to at least one terminating node;
determine a physical route through at least one network for the connection based on data in the request, the physical route physically coupling the originating node and the at least one terminating node through the at least one network, the originating node establishing at least one first rule for physically routing data through the originating node;
determine a virtual route for the connection based on data in the request, the determining comprising selecting at least one virtual node, the at least one virtual node establishing at least one second rule for routing data between the originating node and the at least one terminating node, the at least one virtual node being a virtual element stored by the processor;
establish the connection between the originating node and the at least one terminating node along the physical route within the at least one network; and
establish a detail record for the connection, the detail record including each at least one virtual node in the virtual route and indicating a distribution percentage for each at least one virtual node in the virtual route according to the at least one first rule and/or the at least one second rule.

11. The system of claim 10, wherein the detail record comprises information about:
the originating node;
the at least one terminating node;
a routing path formed by the selected at least two nodes;
at least one routing error;
at least one transmission time;
at least one transmission duration;
an allocation of financial charges to each at least one virtual node among the selected at least two nodes; or
a combination thereof.

12. The system of claim 10, wherein the processor is further configured to determine that the connection between the originating node and the at least one terminating node has failed.

13. The system of claim 12, wherein the determining that the connection between the originating node and the at least one terminating node has failed comprises detecting a failure in at least one of the originating node, the at least one terminating node, and the at least one virtual node.

14. The system of claim 12, wherein the determining that the connection between the originating node and the at least one terminating node has failed comprises labeling the at least one terminating node as a failed termination, the at least one virtual node among the selected at least two nodes as a failed virtual node, or a combination thereof.

15. The system of claim 12, wherein the processor is further configured to:
determine a new virtual route for the connection based on data in the request, the new virtual route comprising at least one new node different from the selected at least one virtual node, the at least one new node establishing at least one new rule for routing data through the at least one new node; and establish a new allocation of credit for processing the data between the originating node and the at least one terminating node according to the at least one new rule.

16. The system of claim 10, wherein the processor is further configured to create the at least one virtual node.

17. The system of claim 16, wherein the creating comprises defining the at least one second rule for the at least one virtual node.

18. The system of claim 16, wherein the creating comprises defining an allocation of financial charges for the at least one virtual node.

* * * * *